United States Patent
Shin et al.

(10) Patent No.: US 8,731,154 B2
(45) Date of Patent: May 20, 2014

(54) IMAGE FORMING APPARATUS AND NOTIFICATION METHOD OF RECEIVING DATA BY FAX

(75) Inventors: Ki-young Shin, Namyangju-si (KR); Sang-jin Lee, Suwon-si (KR); Jin-ah Heo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 339 days.

(21) Appl. No.: 13/038,833

(22) Filed: Mar. 2, 2011

(65) Prior Publication Data
US 2011/0216893 A1 Sep. 8, 2011

(30) Foreign Application Priority Data
Mar. 2, 2010 (KR) .................... 10-2010-0018552

(51) Int. Cl.
*H04M 11/00* (2006.01)

(52) U.S. Cl.
CPC .................................... *H04M 11/00* (2013.01)
USPC ............ 379/100.06; 379/100.01; 379/100.05

(58) Field of Classification Search
USPC .......................... 379/100.06, 100.01–100.05, 379/100.07–100.14
See application file for complete search history.

(56) References Cited

U.S. PATENT DOCUMENTS

| | | | | |
|---|---|---|---|---|
| 6,240,445 B1* | 5/2001 | Kumar et al. | ................. | 709/206 |
| 8,396,941 B2* | 3/2013 | Douillet et al. | ............... | 709/218 |
| 2003/0167353 A1* | 9/2003 | de Bonet et al. | ............. | 709/318 |
| 2004/0080781 A1* | 4/2004 | Okawa | ......................... | 358/1.15 |
| 2009/0052380 A1* | 2/2009 | Espelien | ....................... | 370/328 |
| 2009/0106414 A1 | 4/2009 | Stavenow et al. | | |
| 2009/0177971 A1* | 7/2009 | Kim et al. | ..................... | 715/739 |

FOREIGN PATENT DOCUMENTS

EP  1 845 683 A1  10/2007
JP  2008-048339  2/2008

OTHER PUBLICATIONS

European Search Report dated Jun. 9, 2011 in corresponding European Patent Application 11156246.8.

* cited by examiner

*Primary Examiner* — Melur Ramakrishnaiah
(74) *Attorney, Agent, or Firm* — Staas & Halsey LLP

(57) ABSTRACT

An image forming apparatus is provided that includes a fax unit which receives fax data; a communication interface which searches for connectable control points; an address management unit which selects a control point to be notified of fax reception information from among the searched control points; and a DLNA stack unit which notifies the selected control point of the fax reception information through the communication interface.

25 Claims, 10 Drawing Sheets

2-Box Push System Usage Interaction Model

Upload System Usage Interaction Model

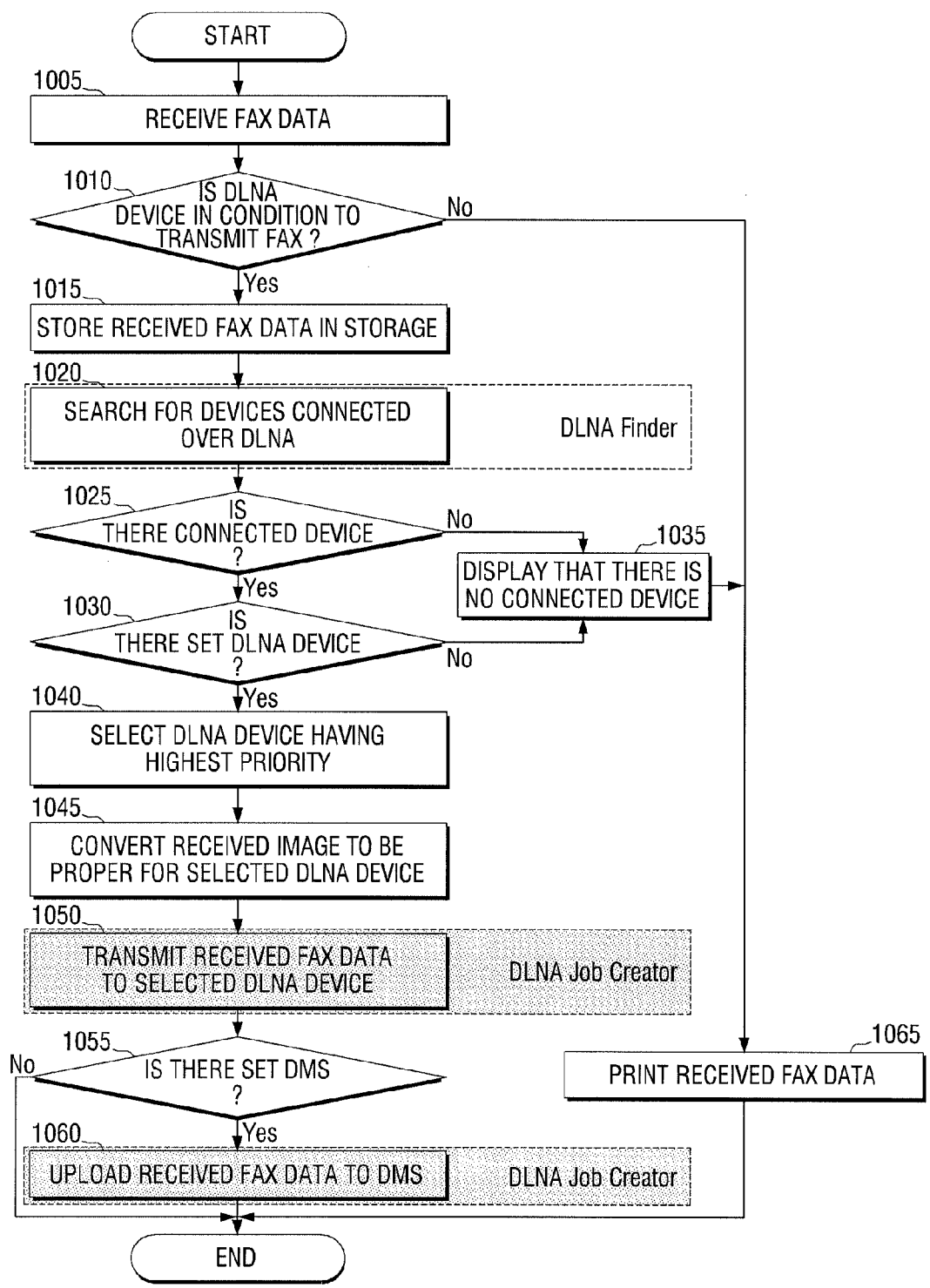

IMAGE FORMING APPARATUS AND NOTIFICATION METHOD OF RECEIVING DATA BY FAX

CROSS-REFERENCE TO RELATED APPLICATIONS

This application claims the benefit of Korean Patent Application No. 2010-0018552, filed in the Korean Intellectual Property Office on Mar. 2, 2010, the disclosure of which is incorporated herein by reference.

BACKGROUND

1. Field

Aspects of the at least one embodiment relate to an image forming apparatus and a method of receiving data by fax, and more particularly, to an image forming apparatus which is capable of notifying a control point of information regarding data received by fax using a digital living network alliance (DLNA) scheme, and a method of receiving data by fax.

2. Description of the Related Art

An image forming apparatus is an apparatus to print printing data generated by a terminal apparatus, such as a computer, on recording paper, and the examples of the image forming apparatus include a copier, a printer, a facsimile machine, and a multi-functional peripheral (MFP) combining the functions of the aforementioned devices in a single device.

A recently widespread image forming apparatus may support a digital living network alliance (DLNA) standard and thus may receive a printing job through not only a terminal apparatus, such as a computer, but also a control point.

The DLNA, which is an organization for standardization of a digital information technology product, was established to provide a standard to allow data such as music, pictures, and moving pictures to be shared among devices. The DLNA aims at establishing a mutually-compatible platform based on a standard already published in the industry and achieving convergence among the industries. The DLNA promotes introduction of a guideline for the manufacturers of household appliances, personal computers, and wireless devices based on the Universal Plug and Play (UPnP) protocols which are being widely used by these manufacturers.

Accordingly, users can enjoy diverse contents within a DLNA network using a control point, and can output a desired content to an image forming apparatus connected over the DLNA network.

However, conventionally, there is only the DLNA control protocol to control a printing job and a scanning job between a control point and an image forming apparatus, and there is no method of controlling a fax job of an image forming apparatus.

Accordingly, conventional image forming apparatuses perform only limited functions, such as outputting data received by fax as soon as the data is received, or storing the data in a memory of the image forming apparatuses or a file server or forwarding the data. That is, in order to output data directly from an image forming apparatus, a user needs to approach the image forming apparatus to check and confirm the received fax.

In addition, it is difficult to identify to which user the received fax is sent in a publicly used fax machine or image forming apparatus.

Accordingly, there is a need for a method of notifying a frequently-used control point of fax reception or transmitting fax data to the frequently-used control point, and a method of notifying a plurality of users of a received fax classifiably.

SUMMARY

Aspects of the at least one embodiment relate to an image forming apparatus which transmits information regarding data received by fax to a control point set by a user using a digital living network alliance (DLNA) scheme and a method of receiving data by fax.

Another aspect of the at least one embodiment relates to an image forming apparatus which notifies a plurality of users of information regarding a received fax classifiably and a method of receiving data by fax.

Additional aspects and/or advantages will be set forth in part in the description which follows and, in part, will be apparent from the description, or may be learned by practice of the invention.

The foregoing and/or other aspects are achieved by providing an image forming apparatus connectable to a control point using a digital living network alliance (DLNA), the image forming apparatus including a fax unit which receives fax data; a communication interface which searches for connectable control points; an address management unit which selects a control point to be notified of fax reception information from among the searched control points; and a DLNA stack unit which notifies the selected control point of the fax reception information through the communication interface.

The image forming apparatus may further include a storage unit which stores a fax number and control point information corresponding to a fax number, wherein the fax unit may extract a fax number of a transmitter from the received fax data, and the address management unit may select a control point which will be notified of the fax reception information based on the control point information corresponding to the extracted fax number.

The image forming apparatus may further include a storage unit which stores a fax number, user information corresponding to a fax number, and control point information corresponding to a user, wherein the fax unit may extract a fax number of a transmitter from the received fax data, and the address management unit may recognize user information corresponding to the extracted fax number, and selects a control point which will be notified of the fax reception information based on the control point information corresponding to the recognized user information.

The image forming apparatus may further include a user interface which displays the searched control points, and receives a selection of a control point which will receive the fax reception information from among the displayed control points, wherein the storage unit may store the selected control point as the control point information.

The control point information may include information regarding an address of a plurality of control points and information regarding a priority of each of the plurality of control points, and the DLNA stack unit may control the communication interface to sequentially notify the selected control point of the fax reception information based on the priority information.

The fax reception information may include at least one of a message indicating that fax data is received and a fax number of a transmitter which transmits the fax data.

The DLNA stack unit may control the communication interface to notify the fax reception information in an event notification method.

The DLNA stack unit may generate a fax receiving job which includes the fax reception information, and control the communication interface to transmit the generated fax receiving job to the selected control point.

The fax receiving job may include the received fax data.

The DLNA stack unit may transmit the received fax data to a preset control point, and may generate a fax receiving job which enables the selected control point to receive the transmitted fax data from the preset control point.

The image forming apparatus may further include an image forming unit which prints the received fax data.

The image forming apparatus may further include a controlling unit which, if transmitting the fax reception information to the selected control point fails, controls the image forming unit to print the received fax data.

The foregoing and/or other aspects are achieved by providing a method for receiving fax data of an image forming apparatus connectable to a control point using a digital living network alliance (DLNA), the method including receiving fax data; searching for connectable control points; selecting a control point to be notified of fax reception information from among the searched control points; and notifying the selected control point of the fax reception information through the communication interface.

The method may further include extracting a fax number of a transmitter from the received fax data, wherein the selecting may select a control point which will be notified of the fax reception information based on the pre-stored control point information corresponding to the extracted fax number.

The method may further include extracting a fax number of a transmitter from the received fax data, and the selecting may recognize pre-stored user information corresponding to the extracted fax number, and select a control point which will be notified of the fax reception information based on the pre-stored control point information corresponding to the recognized user information.

The method may further include displaying the searched control points; receiving a selection of a control point which will receive the fax reception information from among the displayed control points; and storing the selected control point as the control point information.

The control point information may include information regarding an address of a plurality of control points and information regarding a priority of each of the plurality of control points, and the notifying may sequentially notify the selected control point of the fax reception information based on the priority information.

The fax reception information may include at least one of a message indicating that fax data is received and a fax number of a transmitter which transmits the fax data.

The notifying may notify the fax reception information in an event notification method.

The notifying may include generating a fax receiving job comprising the fax reception information; and transmitting the generated fax receiving job to the selected control point.

The fax receiving job may include the received fax data.

The notifying may include transmitting the received fax data to the a preset control point; generating a fax receiving job which enables the selected control point to receive the transmitted fax data from the preset control point; and transmitting the generated fax receiving job to the selected control point.

The method may further include printing the received fax data.

The printing, if transmitting the fax reception information to the selected control point fails, may output the received fax data.

The foregoing and/or other aspects are achieved by providing a notification method, including: storing user information corresponding to a fax number and control points corresponding to the user information in at least one lookup table; receiving fax data at an image forming apparatus; selecting at least one control point from the stored control points corresponding to a user based on the received fax data; and notifying the at least one control point that the fax data is received.

The notification method may further include setting a notification priority of each of the control points.

BRIEF DESCRIPTION OF THE DRAWINGS

These and/or other aspects and advantages will become apparent and more readily appreciated from the following description of the embodiments, taken in conjunction with the accompanying drawings of which:

FIGS. 9 and 10 are flowchart provided to explain a method of receiving data by fax according to at least one embodiment.

DETAILED DESCRIPTION

Figure 1:
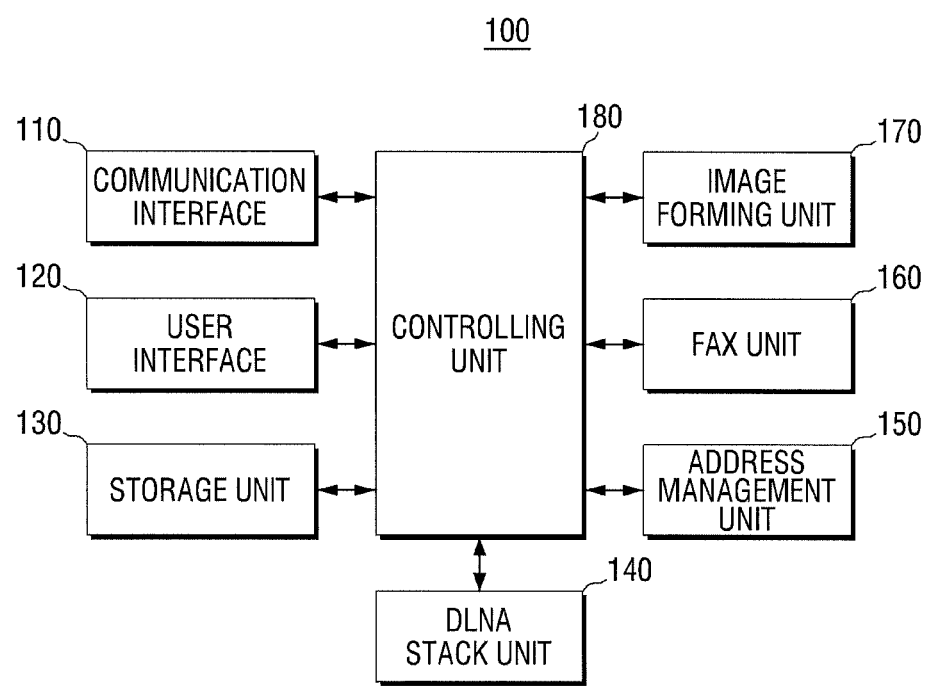
FIG. 1 is a block diagram illustrating an image forming apparatus according to at least one embodiment.

Reference will now be made in detail to the at least one embodiment, examples of which are illustrated in the accompanying drawings, wherein like reference numerals refer to like elements throughout. The at least one embodiment is described below by referring to the figures.

FIG. 1 is a block diagram illustrating an image forming apparatus according to at least one embodiment.

Referring to FIG. 1, the image forming apparatus 100 may include a communication interface 110, a user interface 120, a storage unit 130, a DLNA stack unit 140, an address management unit 150, a fax unit 160, an image forming unit 170, and a controlling unit 180.

The communication interface 110 may transmit and receive data (for instance, fax job data and content) to and from a control point over a DLNA network. To be specific, the communication interface 110 may be connected to the control point according to various communication protocols, such as near field communication (NFC), Wi-Fi, and Bluetooth, for example.

Herein, the control point refers to a DLNA compliant device, such as a mobile phone, which may share its content with the other DLNA compliant devices on a DLNA network, connect to the image forming apparatus on the DLNA network, and output content. For instance, the control point may be one of a digital media server (DMS), a digital media player (DMP), and a digital media renderer (DMR), which are all compliant with a DLNA guideline, for example.

Herein, the DMS performs the function of a media server device (MSD) in an area of UPnP AV, that is, the function of providing digital media content, and searching for the digital media content in the DMS so that a DLNA network user may display or divide content. For example, the DMS may include a video cassette recording (VCR) device, a compact disc (CD) player, a digital versatile disc (DVD) player, an MPEG layer 3 (MP3) player, a settop box (STB), a television (TV) tuner, a radio tuner, a personal computer (PC), etc.

The DMR which executes the selected media may include a TV, a stereo speaker, etc. The DMP, which is a DMR including a UPnP control point (CP), performs the functions of a media renderer device (MRD) and a media render control point (MRCP). That is, the DMP selects, controls, and executes media content.

The communication interface 110 may search for control points connected to a DLNA network. To be specific, the communication interface 110 may search for a control point connectable to the image forming apparatus 100 using a UPnP discovery protocol which is defined in a DLNA guideline. The communication interface 110 may receive device information regarding the searched control point.

The communication interface 110 may transmit fax reception information to a selected control point. To be specific, the communication interface 110 may notify the control point selected by the address management unit 150, which will be explained later, of the fax reception information using an event notification method or a job transmission method (or a content transmission method). The detailed operation of transmitting the fax reception information to the selected control point will be explained later with reference to FIGS. 2 to 5.

Herein, the fax reception information refers to a message which notifies the control point that the image forming apparatus 100 receives a fax. The fax reception information may include only the message for fax reception, and may also include a fax number of a transmitter. In addition, the fax reception information may include the received fax data.

The user interface 120 may include a plurality of function keys through which a user sets or selects various functions supported by the image forming apparatus 100, for example, or may include any other type of inputting device, and displays various information provided by the image forming apparatus 100. The user interface 120 may be implemented as a device, such as a touch pad, which is configured to support concurrent input and output, or a device combining functions of a mouse and a monitor.

To be specific, the user interface (UI) 120 may display the control point which is searched through the communication interface 110 on a UI window. Through the UI window, a user may select a control point which will be notified of the fax reception information. A user may select a plurality of control points to be notified of the fax reception information, and set the priority for each of the control points. The control point selected by a user may be stored in the storage unit 130 as control point information. Specifically, the control point information may include information regarding a name, an address, and a priority of the control point.

The user interface 120 may display information on the fax number stored in the image forming apparatus 100, and receive user information for each fax number. The user interface 120 may receive a setting of the control point which will be notified of the fax reception information for each user. If the image forming apparatus 100 does not include the information on the fax number, the image forming apparatus 100 may receive the information on the fax number from a control point, such as a mobile phone, and use the information. The fax number information stored in the image forming apparatus 100 may also be input by a user through the user interface 120, or updated.

The user interface 120 may store fax number information, user information, and control point information which are set by a user in the storage unit 130.

The storage unit 130 may store received fax data. Specifically, the storage unit 130 may store the data received by fax through the fax unit 160 or data processed by the fax unit 160. The fax unit 160 will be explained later. The storage unit 130 may store fax job data which is generated by the DLNA stack unit 140, or store a fax number, user information, control point information, etc. which is set through the user interface 120. The storage unit 130 may store the fax number, the user information, the control point information, etc. in a lookup table. Detailed examples of the lookup table will be explained later with reference to FIGS. 7 and 8. The storage unit 130 may be implemented as an internal storage medium or an external storage medium of the image forming apparatus 100, such as a removable disk including a USB memory.

The DLNA stack unit 140 may control the communication interface 110 to notify the selected control point of the fax reception information. To be specific, the DLNA stack unit 140 may generate event information or fax job data so that the control point selected by the address management unit 150 is notified of the fax reception information.

More specifically, if fax data is received through the fax unit 160, the DLNA stack unit 140 may generate a message indicating only that a fax is received as the fax reception information, and control the communication interface 110 to transmit the generated message to the selected control point using an event notification method. The above message may include only the fax reception state, or may also include a fax number of a transmitter.

If fax data is received through the fax unit 160, the DLNA stack unit 140 may generate a fax receiving job, and control the communication interface 110 to transmit the generated fax receiving job to the selected control point in a 2-box push manner, an upload manner, or a 3-box manner. Herein, the fax receiving job may be data in a form of an extended telephony markup language (XTML), and may include the message indicating that a fax is received. The generated fax receiving job may include a fax number of a transmitter and/or the received fax data.

According to the 2-box push manner and the upload manner, the first DLNA device notifies the second DLNA device that content will be transmitted and then transmits the content to the second DLNA device. In this exemplary embodiment, the DLNA stack unit 140 may notify the fax reception information using the 2-box push manner and the upload manner by notifying the control point selected by the address management unit 150 that a fax receiving job will be transmitted, and then will transmit a fax job to the selected control point.

According to the 3-box manner, the first DLNA device notifies the second DLNA device that content pre-stored in the third DLNA device will be transmitted, and the third DLNA device transmits the content to the second DLNA device. In this exemplary embodiment, the DLNA stack unit 140 may enable a selected control point to receive fax data from a preset control point (or a DLNA device, for example, a DLNA server) using such a 3-box manner by transmitting fax data from the fax unit 160 to the preset control point, generating a fax receiving job which allows the selected control point to receive the fax data from the preset control point, and transmitting the fax receiving job to the selected control point.

When transmitting the fax data to the preset control point, the DLNA stack unit 140 may store the fax data in a folder of a user who receives the fax data. For instance, if the received fax data is for a user A, the DLNA stack unit 140 may transmit the fax data to the preset control point, and concurrently store the fax data in a folder of the user A.

If there are a plurality of control points which will be notified of the fax reception information, the DLNA stack unit 140 may control the communication interface 110 to transmit the fax reception information to the selected control points sequentially based on the priority stored in the storage unit 130. Alternatively, it may be implemented that if the fax reception information is completely transmitted to the control point having the higher priority, the operation of notifying the other control points of the fax reception information is omitted.

The address management unit 150 may select a control point to which fax reception information will be notified. Specifically, the address management unit 150 may select all of the control points which are searched by the communication interface 110 in order to notify the fax reception information.

If control point information preset by a user is stored in the storage unit 130, the address management unit 150 may select a control point based on the preset control point information so that only the control point is notified of the fax reception information.

If the priority is set to the control point information, the address management unit 150 may select the control point having the highest priority from among the control points searched by the communication interface 110 to preferentially notify the selected control point of the fax reception information.

The address management unit 150 may select a control point using a fax number of a transmitter. Specifically, if a plurality of fax numbers of transmitters and control points corresponding to each number are stored in the storage unit 130 as control point information, the address management unit 150 may select a control point device corresponding to the fax number of the transmitter extracted by the fax unit 160.

If fax numbers of a plurality of transmitters are stored in the storage unit 130, and a user corresponding to each fax number is stored as user information, the address management unit 150 may select a user corresponding to the fax number of the transmitter extracted by the fax unit 160, and select the control point corresponding to the user as a control point which will be notified of the fax reception information.

The fax unit 160 may perform a fax job. Specifically, the fax unit 160 may receive or transmit fax data from and to an external device. The fax unit 160 may extract a fax number (CID) of a transmitter from fax data transmitted by the external device.

The fax unit 160 may perform image processing with respect to the received fax data. To be specific, the fax unit 160 may perform image processing, such as file format conversion or decompression, with respect to the received fax data. The fax data on which such image processing is performed may be stored in the storage unit 130 as content.

The content recited herein may include image data, text, hypertext markup language (HTML) document, and a file which is capable of being direct-printed in an image forming apparatus. The direct-printing refers to a printing method that can print simply by transmitting a corresponding file to an image forming apparatus without additional conversion of the file. For example, JPG, PDF, and XPS files can be direct-printed.

The image forming unit 170 may print fax data. Specifically, the image forming unit 170 may print the fax data received from the fax unit 160. In this situation, the image forming unit 170 may print the fax data reflecting a preset printing option.

The controlling unit 180 controls the respective components of the image forming apparatus 100. Specifically, if the fax unit 160 receives data, the controlling unit 180 may control the communication interface 110 and the DLNA stack unit 140 to search for a connectable control point. The controlling unit 180 may control the address management unit 150 so that a control point to be notified of the fax reception information is selected from among the searched control points. In addition, the controlling unit 180 may control the communication interface 110 and the DLNA stack unit 140 so that the selected control point is notified of the fax reception information.

The controlling unit 180 may control the image forming unit 170 to print the received fax data only when the operation of notifying the control point selected by the address management unit 150 of the fax reception information fails. Alternatively, the image forming apparatus 100 may be implemented to output the received fax data irrespective of the notification of the fax reception information, and the setting may be changed by a user.

As described above, the image forming apparatus 100, according to at least one embodiment, notifies a connectable control point of fax reception information if the image forming apparatus 100 receives fax data. Therefore, a user may easily identify that fax data is received.

The image forming apparatus 100, according to at least one embodiment, is capable of transmitting fax data to a control point. Therefore, a user can easily check the fax data without checking the image forming apparatus 100 in person.

The image forming apparatus 100, according to at least one embodiment, extracts a fax number of a transmitter from the received fax data, and notifies a control point corresponding to the extracted fax number of the fax reception information. Therefore, the image forming apparatus 100 can easily distinguish a user who will receive the fax data and notify the user of fax reception.

Figure 2:
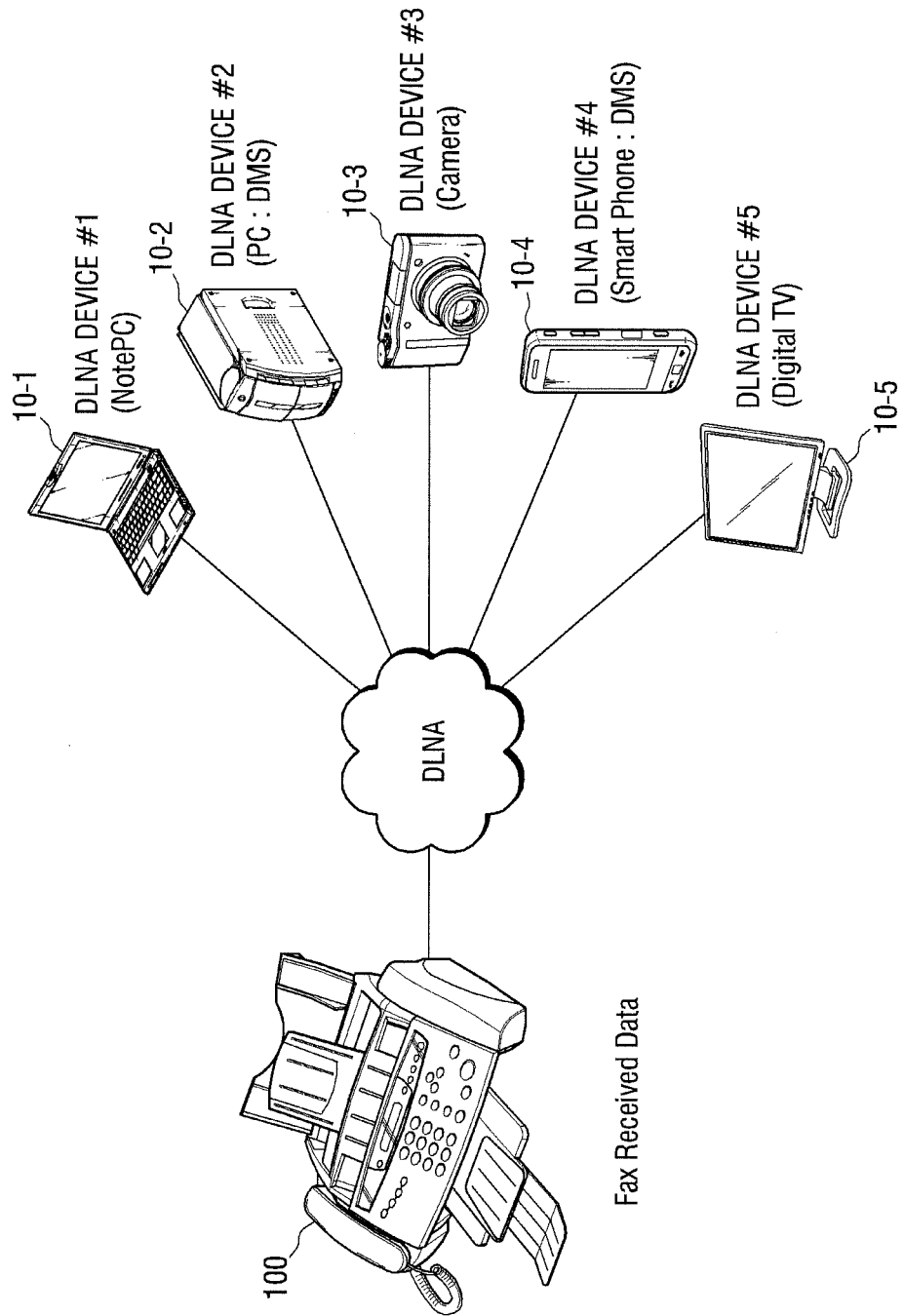
FIGS. 2 to 4 are views illustrating a method of transmitting and receiving data between an image forming apparatus and a control point using a DLNA scheme.
Figure 3:
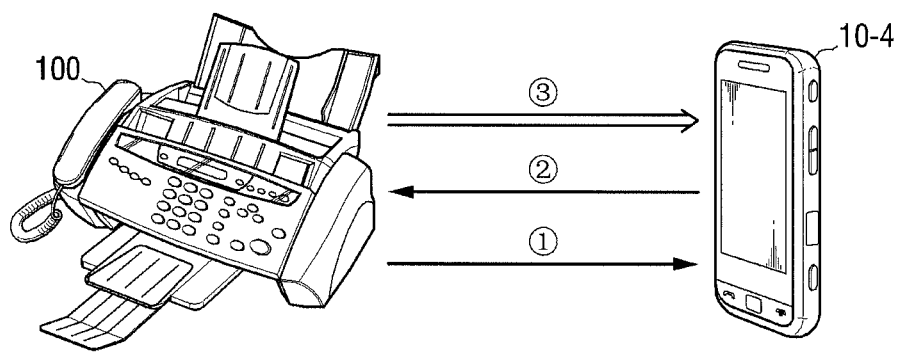
Figure 4:
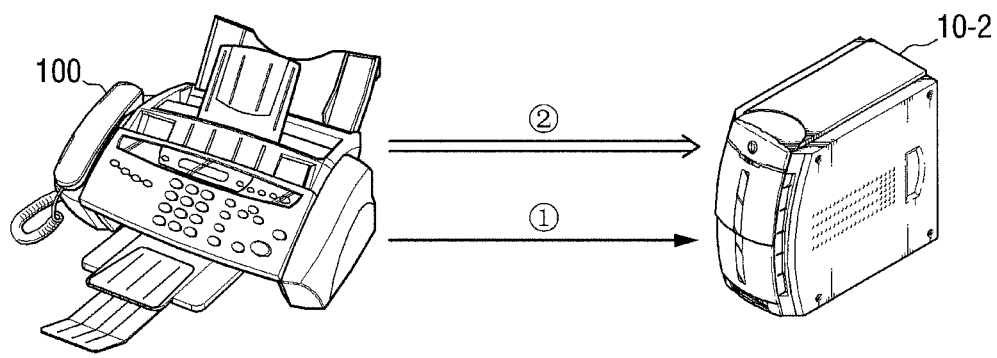

FIGS. 2 to 4 are views illustrating a method of transmitting and receiving data between an image forming apparatus and a control point using a DLNA scheme.

Referring to FIG. 2, the image forming apparatus 100 is connectable to a plurality of control points 10-1, 10-2, 10-3, 10-4, 10-5. If the image forming apparatus 100 receives fax data, the image forming apparatus 100 may notify a selected control point of fax reception information. For example, if the second control point 10-2 has the first priority and the third control point 10-3 has the second priority according to the priority preset by a user regarding notification of fax reception, the image forming apparatus 100 may transmit the fax reception information to the second control point 10-2 first, and then to the third control point 10-3.

Meanwhile, if the control point information is transmitted according to an event notification method, the image forming apparatus 100 may concurrently notify the second and the third control points 10-2, 10-3 of the event including the fax reception information.

Alternatively, if a user presets the second control point 10-2 to store fax data, the image forming apparatus 100 may transmit the received fax data to the second control point 10-2 first, and then notify the other control point 10-3 of the fax reception information which enables receiving the fax data from the preset control point 10-2.

FIG. 3 shows the 2-box push manner to transmit data according to a DLNA standard. In the 2-box push manner, the first DLNA device notifies the second DLNA device that content will be transmitted (①), and if the second DLNA device requests the first DLNA device to transmit the content (②), the first DLNA device transmits the content to the second DLNA device (③). Such a 2-box push manner is used to transmit content from an AV device to a digital media render (DMR) such as a rendering device.

Using the above 2-box push manner, the image forming apparatus 100 notifies the control point 10-4 selected by the address management unit 150 that a fax receiving job will be transmitted (①), and if the selected control point 10-4 requests the image forming apparatus 100 to transmit the fax receiving job (②), the image forming apparatus 100 may notify the control point 10-4 of fax reception information by transmitting the fax receiving job to the control point 10-4 (③).

FIG. 4 shows the upload manner to transmit data according to a DLNA standard. In the upload manner, the first DLNA device notifies the second DLNA device that content will be transmitted (①), and the first DLNA device transmits the content to the second DLNA device (②). Such an upload manner is used to transmit content from a device such as a digital camera to a digital media server (DMS).

Using the above upload manner, the image forming apparatus 100 may notify the control point 10-2 selected by the address management unit 150 of fax reception information by notifying the control point 10-2 that a fax receiving job will be transmitted (①) and transmitting the fax receiving job to the control point 10-2 (②). The upload manner may be used for the operation that the image forming apparatus 100 transmits received fax data to a preset control point.

Figure 5:
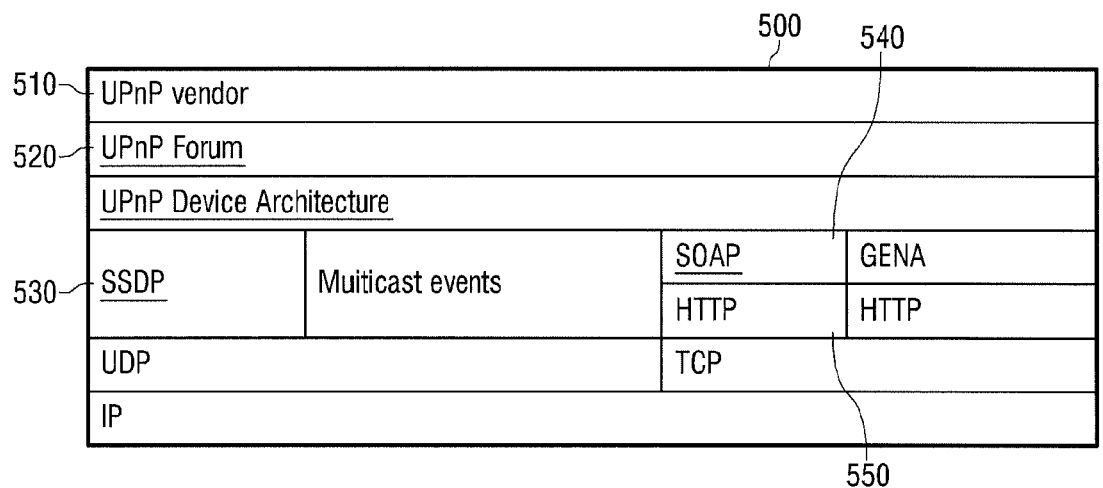
FIG. 5 is a structural diagram illustrating a UPnP protocol stack according to at least one embodiment.

FIG. 5 is a structural diagram 500 illustrating a UPnP protocol stack according to at least one embodiment.

The UPnP Vendor 510 is a detailed protocol section of a vendor. The UPnP Forum 520 is a protocol section defined by a UPnP Forum committee. The simple service discovery protocol (SSDP) 530 is a section in which the operation of notifying an opposite device of a user's device is performed by the request to search for a device, the operation of searching available device and service, and advertisement.

The simple object access protocol (SOAP) 540 is a section in which DLNA devices exchange their events. The image forming apparatus, according to at least one embodiment, may transmit fax reception information to a selected control point in the SOAP section.

The general event notification architecture (GENA) is a section in which the usage of XML and HTTP 550 is defined to execute a remote procedure, to execute a specific function of a device remotely, or to collect information.

Figure 6:
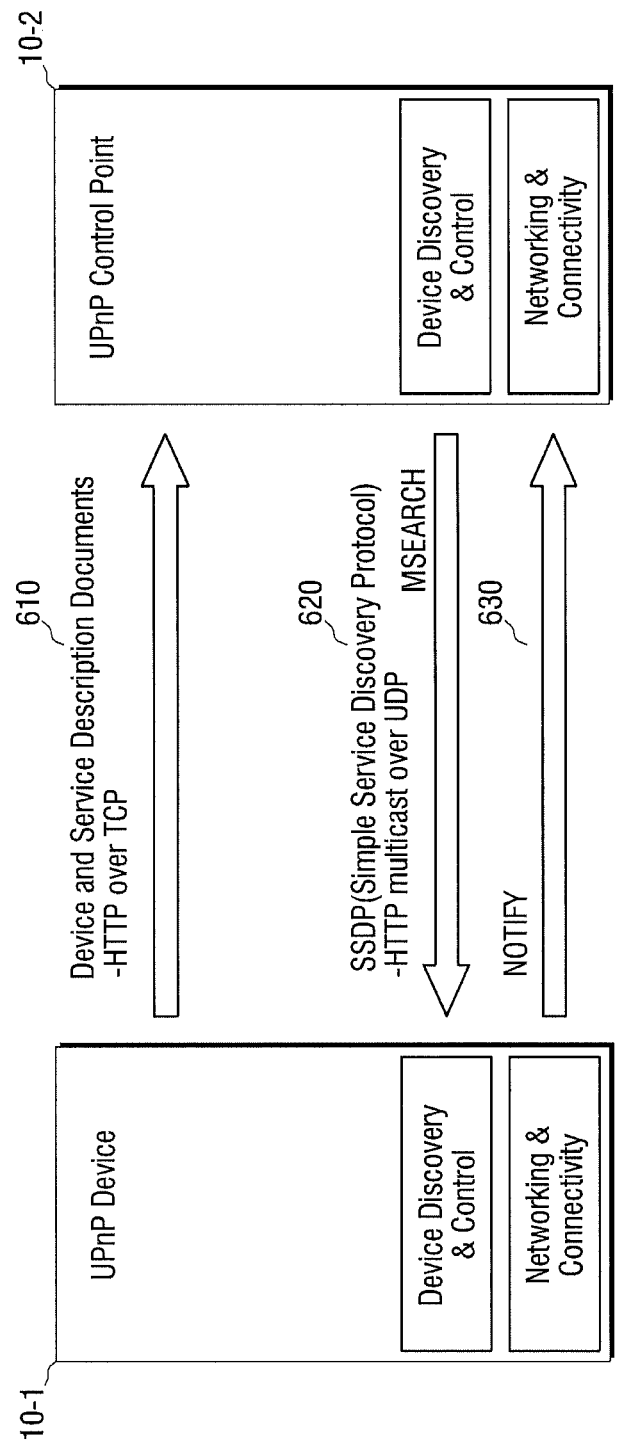
FIG. 6 is a view provided to explain the operation of searching for a control point on an image forming apparatus according to at least one embodiment.

The image forming apparatus 100, according to at least one embodiment, may perform functions, such as addressing, discovery, description, controlling, eventing, and presentation using the above UPnP. The operations regarding the discovery and description may be performed as shown in FIG. 6. Specifically, one DLNA device 10-1 may transmit device and service description documents (e.g., HTTP over TCP) to a second DLNA device, control point 10-2 (610). The control point 10-2 transmits data using a simple service discovery protocol (e.g., HTTP multicast over UDP) to the first DLNA device 10-1 (620). Then the first DLNA device 10-1 transmits a notification to the control point 10-2 (630).

Figure 7:
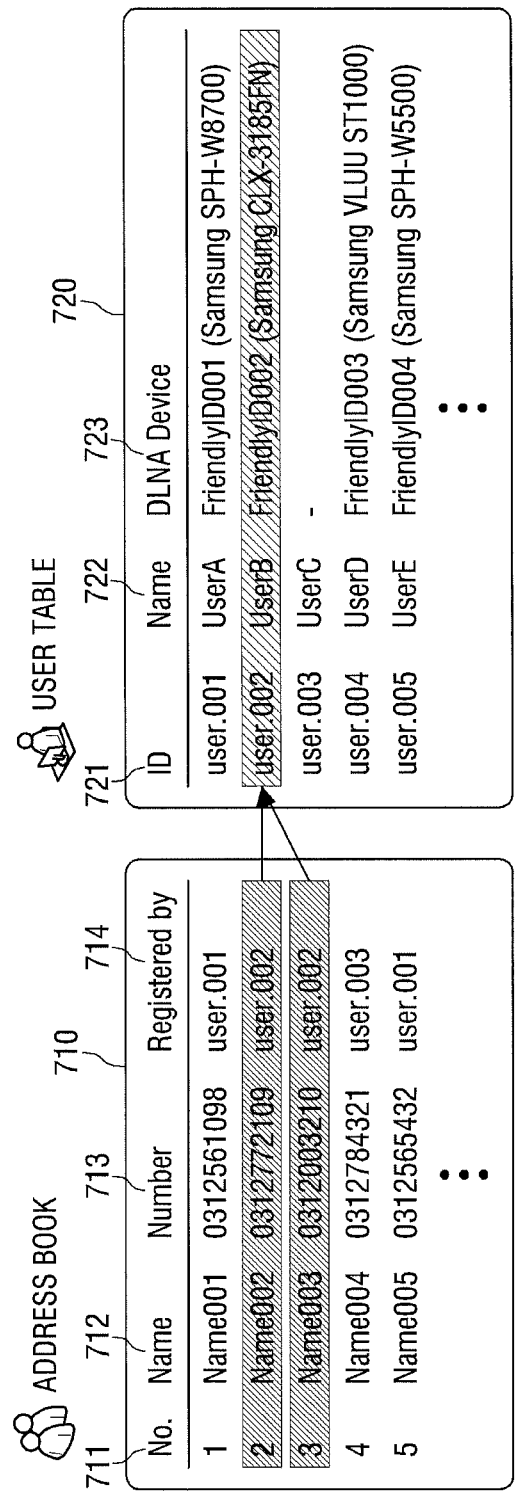
FIGS. 7 and 8 are views illustrating a lookup table which is stored in a storage unit of FIG. 1 according to at least one embodiment.
Figure 8:
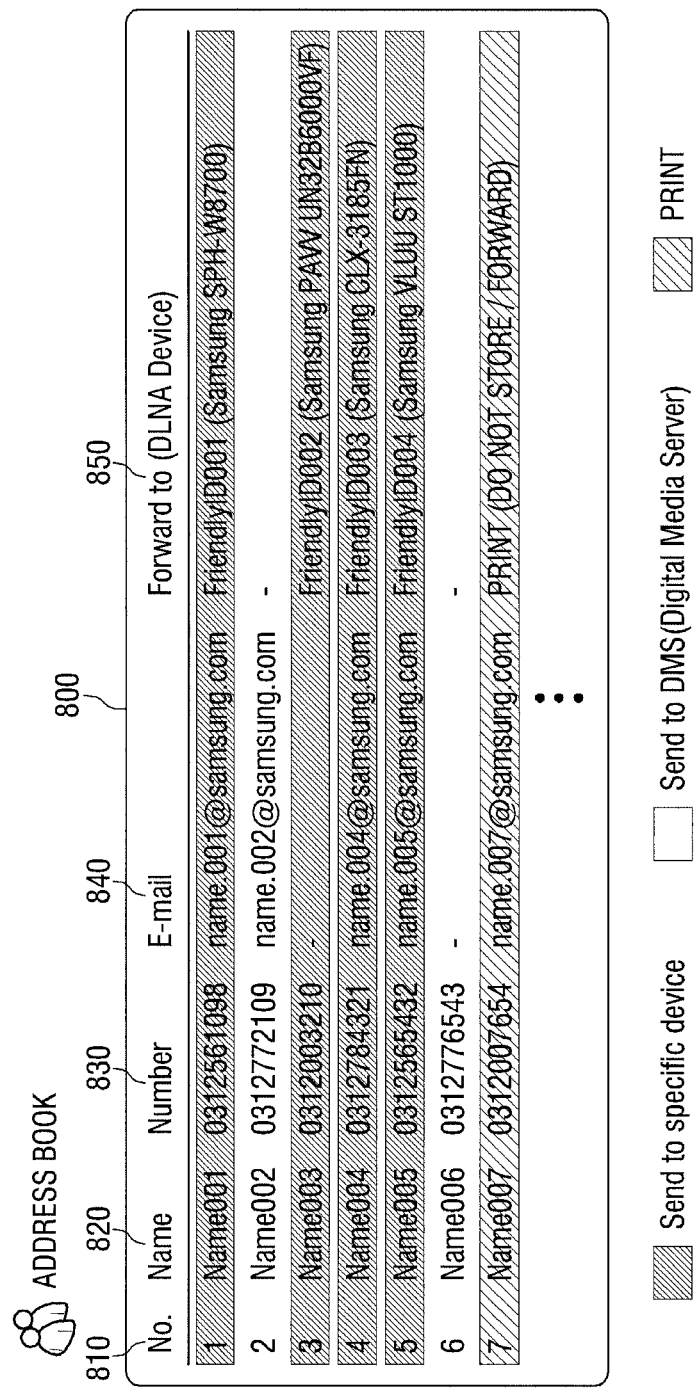

FIGS. 7 and 8 are views illustrating a lookup table which is stored in the storage unit of FIG. 1 according to at least one embodiment.

Specifically, FIG. 7 shows a lookup table which is stored in the storage unit 130 when the control point to be notified of fax reception information is set for each user. A lookup table 710 stores user information corresponding to each fax number, and a lookup table 720 stores control points corresponding to each user.

Specifically, the lookup table 710 includes a number 711, a name of a fax number 712, a fax number 713, and an identification code (or user name) 714. Accordingly, the image forming apparatus 100 may identify to which user the currently received fax is notified using the lookup table 710 and a fax number (CID) of a transmitter included in the received fax data.

The lookup table 720 includes an identification (ID) 721, a user name 722, and a control point 723 corresponding to a user. If it is determined that fax reception information needs to be notified to a user through the lookup table 710, the image forming apparatus 100 may select a control point which will be notified of the fax reception information using the lookup table 710. In the lookup table 720 according to this exemplary embodiment, a single control point is set for each user, but this should not be considered limiting. It may be implemented that a plurality of control points are set for each user.

The image forming apparatus 100 according to the exemplary embodiment may notify only the user corresponding to the received fax data that fax data is received using such a lookup table.

Referring to FIG. 8, a lookup table 800 includes a number 810, a fax name 820, a fax number 830, and an e-mail address 840 of a user corresponding to each fax number, and a control point 850 corresponding to each fax number.

Accordingly, the image forming apparatus 100 may determine to which control point fax reception information needs to be transmitted using the lookup table 800 and a fax number of a transmitter included in the received fax data.

Figure 9:
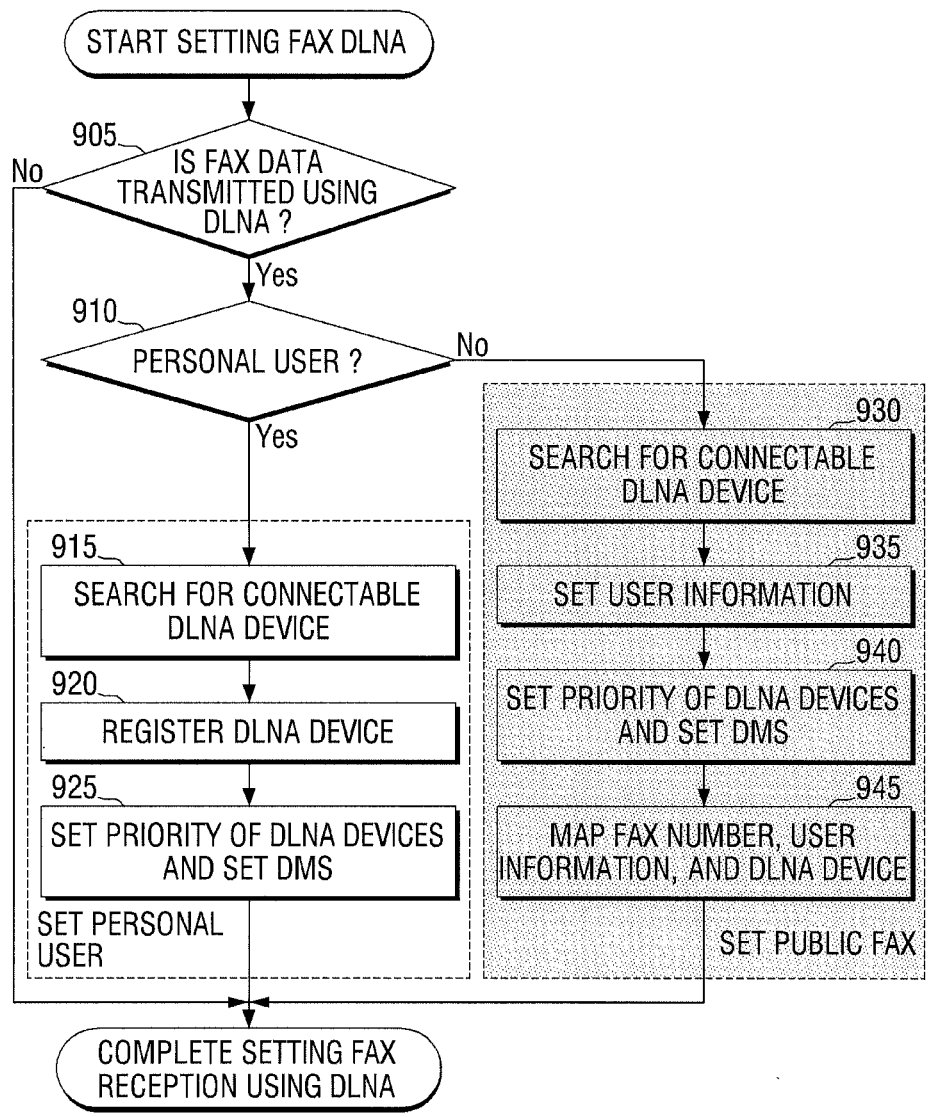

FIGS. 9 and 10 are flowcharts provided to explain a method of receiving data by fax according to at least one embodiment. For convenience of description, the operation of setting the notification (that is, the operation before receiving fax data) and the operation after receiving fax data will be explained, respectively.

FIG. 9 shows the flowchart to explain the process of setting a notification of fax data transmission according to a DLNA scheme. If a user changes a setting of fax transmission on the image forming apparatus 100, it is selected whether or not to use the function of notifying fax transmission information in operation 905. However, such operation may be omitted as occasion demands.

If the function of notifying fax transmission information is selected, whether the image forming apparatus 100 is currently used by one user or a plurality of users may be selected in operation 910. The selection may be performed after the operation of searching for connectable control points.

The control points connectable to the image forming apparatus 100 are searched in operations 915, 930, and the searched control point may be registered as a control point which will be notified of the fax reception information in operation 920. It may be implemented that the searched control points are displayed so that a user selects a control point which will be notified of the fax reception information, and the selected control point is registered.

If a plurality of control points is searched, the priority of each control point may be set in operation 925. To be specific, the priority may be set by a selection of a user, or automatically set considering the frequency of connection to the image forming apparatus 100.

A user may set user information (or group information) and information regarding the control point corresponding to a user on the image forming apparatus 100 that a plurality of users use in operation 935. The priority of control point for each user may be set in operation 940. The user information set by a user and the control point information may be mapped with each other and then stored in a lookup table in operation 945.

FIG. 10 shows a flowchart provided to explain a method of receiving data by fax.

If fax data is received in operation 1005, whether the transmission of fax reception information is set or not is determined in operation 1010. If the transmission of fax reception information is not set, the received fax data is printed in operation 1065.

If the transmission of fax reception information is set, the received fax data may be temporarily stored in the storage unit 130 in operation 1015.

A fax number (CID) of a transmitter is extracted from the received fax data, and whether or not there are a user and a control point corresponding to the extracted fax number is searched through the lookup table in operation 1020.

The control point connectable to the image forming apparatus 100 is searched in operation 1020. Whether or not there is a control point corresponding to the extracted fax number of a transmitter among the searched control points is determined in operations 1025, 1030. If there is no control point corresponding to the extracted fax number of a transmitter among the searched control points or there is no control point connectable to the image forming apparatus 100, a message indicating that there is no control point which will be notified of the fax reception information is displayed in operation 1035, and the received fax data may be output. Meanwhile, if there is a plurality of control points corresponding to the extracted fax number of a transmitter, whether or not the plurality of control points are connectable to the image forming apparatus 100 is determined. After this, if there are no connectable control points, a message indicating that there is no control point which will be notified of the fax reception information is displayed.

If there is a control point corresponding to the extracted fax number of a transmitter, the fax reception information may be transmitted to the corresponding control point. Specifically, the corresponding control point may be notified of the fax reception information in an event notification method or a job transmission method in operation 1050.

If there is a plurality of control points corresponding to the extracted fax number of a transmitter, the control point having the highest priority is selected from among the control points in operation 1040, and the received fax data may be processed to be content which can be supported by the selected control point in operation 1045. The processed fax data may be transmitted to the selected control point in a job transmission method in operation 1050.

If the preset control point (that is, the function of transmitting fax data to the DMS) is set in operation 1055, the received fax data may be transmitted to the preset control point in operation 1060. Such an operation may be performed prior to the operation 1050.

In the method of receiving fax data according to at least one embodiment, if fax data is received, a connectable control point is notified of fax reception information. Therefore, a user may easily identify that the fax data is received. In addition, since the received fax data is transmitted directly to the control point, a user may check the fax data without moving to the image forming apparatus. The fax number of a transmitter is extracted from the received fax data, and the fax reception information is notified to the control point corresponding to the extracted fax number of a transmitter. Therefore, the received fax number is classifiably notified to a plurality of users. The method of receiving data by fax as shown in FIGS. 9 and 10 may be executed on the image forming apparatus 100 having the structure of FIG. 1 or on a control point having the other structures.

The foregoing exemplary at least one embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image forming apparatus connectable to a control point using a digital living network alliance (DLNA), the image forming apparatus comprising:
   a fax unit receiving fax data;
   a communication interface to search for connectable control points;
   an address management unit selecting a control point to be notified of fax reception information from among the searched control points; and
   a DLNA stack unit notifying the selected control point of the fax reception information through the communication interface.

2. The image forming apparatus according to claim 1, further comprising:
   a storage unit storing a fax number and control point information corresponding to the fax number,
   wherein the fax unit extracts a fax number of a transmitter from the received fax data, and
   the address management unit selects the control point which will be notified of the fax reception information based on the control point information corresponding to the extracted fax number.

3. The image forming apparatus according to claim 1, further comprising:
   a storage unit storing a fax number, user information corresponding to the fax number, and control point information corresponding to a user,
   wherein the fax unit extracts a fax number of a transmitter from the received fax data, and
   the address management unit recognizes user information corresponding to the extracted fax number, and selects the control point which will be notified of the fax reception information based on the control point information corresponding to the recognized user information.

4. The image forming apparatus according to claim 2, further comprising:
   a user interface displaying the searched control points, and receiving a selection of a control point which will receive the fax reception information from among the displayed control points,
   wherein the storage unit stores the selected control point as the control point information.

5. The image forming apparatus according to claim 2, wherein the control point information includes information regarding an address of a plurality of control points and information regarding a priority of each of the plurality of control points, and
   the DLNA stack unit controls the communication interface to sequentially notify the selected control point of the fax reception information based on the priority information.

6. The image forming apparatus according to claim 1, wherein the fax reception information comprises at least one of a message indicating that fax data is received and a fax number of a transmitter which transmits the fax data.

7. The image forming apparatus according to claim 1, wherein the DLNA stack unit controls the communication interface to notify the fax reception information through event notification.

8. The image forming apparatus according to claim 1, wherein the DLNA stack unit generates a fax receiving job which includes the fax reception information, and controls the communication interface to transmit the generated fax receiving job to the selected control point.

9. The image forming apparatus according to claim 8, wherein the fax receiving job includes the received fax data.

10. The image forming apparatus according to claim 8, wherein the DLNA stack unit transmits the received fax data to a preset control point, and generates a fax receiving job that enables the selected control point to receive the transmitted fax data from the preset control point.

11. The image forming apparatus according to claim 1, further comprising:
an image forming unit printing the received fax data.

12. The image forming apparatus according to claim 10, further comprising:
a controlling unit controlling the image forming unit to print the received fax data when transmission of the fax reception information to the selected control point fails.

13. A method of receiving fax data of an image forming apparatus connectable to a control point using a digital living network alliance (DLNA), the method comprising:
receiving fax data at the image forming apparatus;
searching for connectable control points;
selecting a control point to be notified of fax reception information from among the searched control points;
notifying the selected control point of the fax reception information; and
extracting a fax number of a transmitter from the received fax data,
wherein the control point which will be notified of the fax reception information is selected based on pre-stored control point information corresponding to the extracted fax number.

14. The method according to claim 13, further comprising:
extracting a fax number of a transmitter from the received fax data,
wherein pre-stored user information corresponding to the extracted fax number is recognized, and the control point which will be notified of the fax reception information is selected based on pre-stored control point information corresponding to the recognized user information.

15. The method according to claim 13, further comprising:
displaying the searched control points;
receiving a selection of a control point which will receive the fax reception information from among the displayed control points; and
storing the selected control point as the control point information.

16. The method according to claim 13, wherein the control point information includes information regarding an address of a plurality of control points and information regarding a priority of each of the plurality of control points, and
the selected control point is sequentially notified of the fax reception information based on the priority information.

17. The method according to claim 13, wherein the fax reception information comprises at least one of a message indicating that fax data is received and a fax number of a transmitter that transmits the fax data.

18. The method according to claim 13, wherein the fax reception information is notified through event notification.

19. The method according to claim 13, wherein the notifying comprises:
generating a fax receiving job including the fax reception information; and
transmitting the generated fax receiving job to the selected control point.

20. The method according to claim 19, wherein the fax receiving job includes the received fax data.

21. The method according to claim 13, wherein the notifying comprises:
transmitting the received fax data to a preset control point;
generating a fax receiving job which enables the selected control point to receive the transmitted fax data from the preset control point; and
transmitting the generated fax receiving job to the selected control point.

22. The method according to claim 13, further comprising:
printing the received fax data.

23. The method according to claim 22, wherein the received fax data is printed when transmission of the fax reception information to the selected control point fails.

24. A notification method, comprising:
storing user information corresponding to a fax number and control points corresponding to the user information in at least one lookup table;
receiving fax data at an image forming apparatus;
selecting at least one control point from the stored control points corresponding to a user based on the received fax data;
notifying the at least one control point that the fax data is received; and
extracting a fax number of a transmitter from the received fax data,
wherein the control point which will be notified of the fax reception information is selected based on pre-stored control point information corresponding to the extracted fax number.

25. The notification method according to claim 24, further comprising setting a notification priority of each of the control points.

* * * * *